US008114296B2

(12) United States Patent
Chao (10) Patent No.: US 8,114,296 B2
(45) Date of Patent: Feb. 14, 2012

(54) METHOD AND APPARATUS FOR SKIMMING FLOATED SLUDGE

(76) Inventor: Fang Chao, Middletown, NY (US)

( * ) Notice: Subject to any disclaimer, the term of this patent is extended or adjusted under 35 U.S.C. 154(b) by 441 days.

(21) Appl. No.: 12/429,022

(22) Filed: Apr. 23, 2009

(65) Prior Publication Data

US 2010/0270244 A1    Oct. 28, 2010

(51) Int. Cl.
*C02F 1/24* (2006.01)
(52) U.S. Cl. ...... 210/703; 210/744; 210/776; 210/221.2
(58) Field of Classification Search ............... 210/221.2, 210/703, 776, 744
See application file for complete search history.

(56) References Cited

U.S. PATENT DOCUMENTS

| | | | |
|---|---|---|---|
| 1,366,767 A | | 1/1921 | Callow |
| 2,770,365 A | * | 11/1956 | Welsch ......................... 210/608 |
| 3,339,345 A | * | 9/1967 | Sebald et al. ................... 96/157 |
| 3,556,301 A | | 1/1971 | Smith |
| 3,565,254 A | | 2/1971 | Latimer |
| 3,690,463 A | | 9/1972 | O'Brien |
| 3,707,232 A | | 12/1972 | Harrington |
| 3,760,944 A | | 9/1973 | Bell |
| 3,966,614 A | | 6/1976 | Ayers |
| 4,006,086 A | | 2/1977 | Tsunoi |
| 4,008,156 A | * | 2/1977 | Chastan-Bagnis ......... 210/242.1 |
| 4,049,554 A | | 9/1977 | Ayers |
| 4,057,498 A | | 11/1977 | Vidilles |
| 4,085,049 A | | 4/1978 | Hartwick |
| 4,139,470 A | | 2/1979 | Stagemeyer |
| 4,140,737 A | | 2/1979 | Hauser |
| 4,157,952 A | | 6/1979 | Krofta |
| 4,288,319 A | * | 9/1981 | Heijs et al. ..................... 209/166 |
| 4,626,345 A | | 12/1986 | Krofta |
| 4,681,682 A | | 7/1987 | White |
| 5,015,393 A | | 5/1991 | Russell |
| 5,047,156 A | | 9/1991 | Sullivan |
| 5,108,591 A | | 4/1992 | Hagan |
| 5,139,662 A | | 8/1992 | Ozawa |
| 5,143,629 A | | 9/1992 | Lint |
| 5,158,678 A | | 10/1992 | Broussard |
| 5,382,358 A | | 1/1995 | Yeh |
| 5,423,340 A | | 6/1995 | Campbell |
| 5,713,697 A | | 2/1998 | Steiner |
| 5,779,884 A | | 7/1998 | Raymo |
| 5,863,441 A | | 1/1999 | Krofta |
| 5,888,406 A | | 3/1999 | Hnatiuk |
| 6,159,361 A | | 12/2000 | Lapointe |
| 6,287,460 B1 | | 9/2001 | Van Schie |
| 6,709,587 B1 | | 3/2004 | Guilmette |

(Continued)

FOREIGN PATENT DOCUMENTS
EP        0065382        11/1982

*Primary Examiner* — Thomas M Lithgow
(74) *Attorney, Agent, or Firm* — Law Offices of Ira D. Blecker, P.C.

(57) ABSTRACT

A method and device for removing floated matter such as sludge located near the surface of a fluid body is contemplated that employs pneumatic force to remove the floated matter. The contemplated device employs pneumatic force for lifting and blowing the floated matter into an inlet channel. The device is configured to provide substantially uniform airflow across the inlet channel. The inlet channel of the device may also include an adjustable section which allows airflow velocity along the channel to be controlled in a periodic fashion.

20 Claims, 9 Drawing Sheets

U.S. PATENT DOCUMENTS

| | | |
|---|---|---|
| 6,790,370 B2 | 9/2004 | Terrien |
| 6,875,351 B2 | 4/2005 | Arnaud |
| 6,921,478 B2 | 7/2005 | Lambert |
| 6,960,294 B2 | 11/2005 | Arnaud |
| 7,014,779 B1 | 3/2006 | Kirchner |
| 7,384,548 B2 | 6/2008 | Terrien |
| 2003/0010685 A1 | 1/2003 | Michel |
| 2004/0168964 A1 | 9/2004 | Lambert et al. |
| 2005/0126996 A1 | 6/2005 | Herring, Sr. |
| 2007/0012605 A1 | 1/2007 | Chiang |
| 2008/0185351 A1 | 8/2008 | Hughes |
| 2008/0190834 A1 | 8/2008 | Urquhart et al. |
| 2010/0270244 A1* | 10/2010 | Chao .............................. 210/776 |

* cited by examiner

SECTION A0-A0

*Fig. 4A*

SECTION A1-A1

*Fig. 4B*

SECTION A2-A2

*Fig. 4C*

SECTION A3-A3

*Fig. 4D*

SECTION A4-A4

*Fig. 4E*

SECTION A5-A5

*Fig. 4F*

SECTION E4-E4  SECTION E3-E3  SECTION E2-E2

SECTION E1-E1   SECTION E0-E0

METHOD AND APPARATUS FOR SKIMMING FLOATED SLUDGE

FIELD OF THE INVENTION

The present invention relates generally to the field of dissolved air flotation and particularly to a device for skimming floated sludge from the surface of a fluid body.

BACKGROUND

Several techniques, including a process known as dissolved air flotation (DAF), currently exist for removing suspended contaminants from a fluid body. The DAF process involves releasing dissolved air in a tank filled with the contaminated fluid. The released air forms microscopic bubbles which adhere to the suspended contaminants. The bubbles subsequently carry the suspended contaminants to the surface of the fluid body where they form a layer of floating sludge. Several devices are currently used for removing this sludge layer from the underlying fluid body. Existing devices, such as that described in U.S. Pat. No. 5,863,441, predominantly require the use of rakes, scrapers or mechanical scoops for separating the sludge layer. These systems are complex systems with numerous moving parts, making them susceptible to wear and mechanical failure. Furthermore, existing devices are costly and difficult to manufacture. Other prior art devices, such as those disclosed in U.S. Pat. Nos. 3,760,944 and 1,366,767 employ negative air pressure to suction oil, froth or foam from the surface of an underlying body. Such devices are not however feasible for removing floating sludge since floating sludge is at least partially submerged below the surface of the underlying body. Alternate systems for removing floating matter such as sludge from a fluid body are thus desired.

DETAILED DESCRIPTION

Reference will now be made in detail to the present exemplary embodiments of the invention, examples of which are illustrated in the accompanying drawings.

Applicant has recognized several deficiencies in existing skimmer devices. The present invention overcomes the limitations of prior art skimmer devices by providing a pneumatic skimmer device adapted to provide substantially uniform airflow across the length of an inlet channel. The inlet channel of the contemplated skimmer device may also include an adjustable section for providing precise control of the airflow velocity along the inlet channel. Control of the airflow velocity provides a mechanism for allowing floated sludge to be removed in a periodic manner (e.g. as the sludge builds up in front of the inlet channel). The uniformity and control of airflow through the inlet channel of the contemplated skimmer device allows sludge to be removed without significant dilution.

Figure 1A:
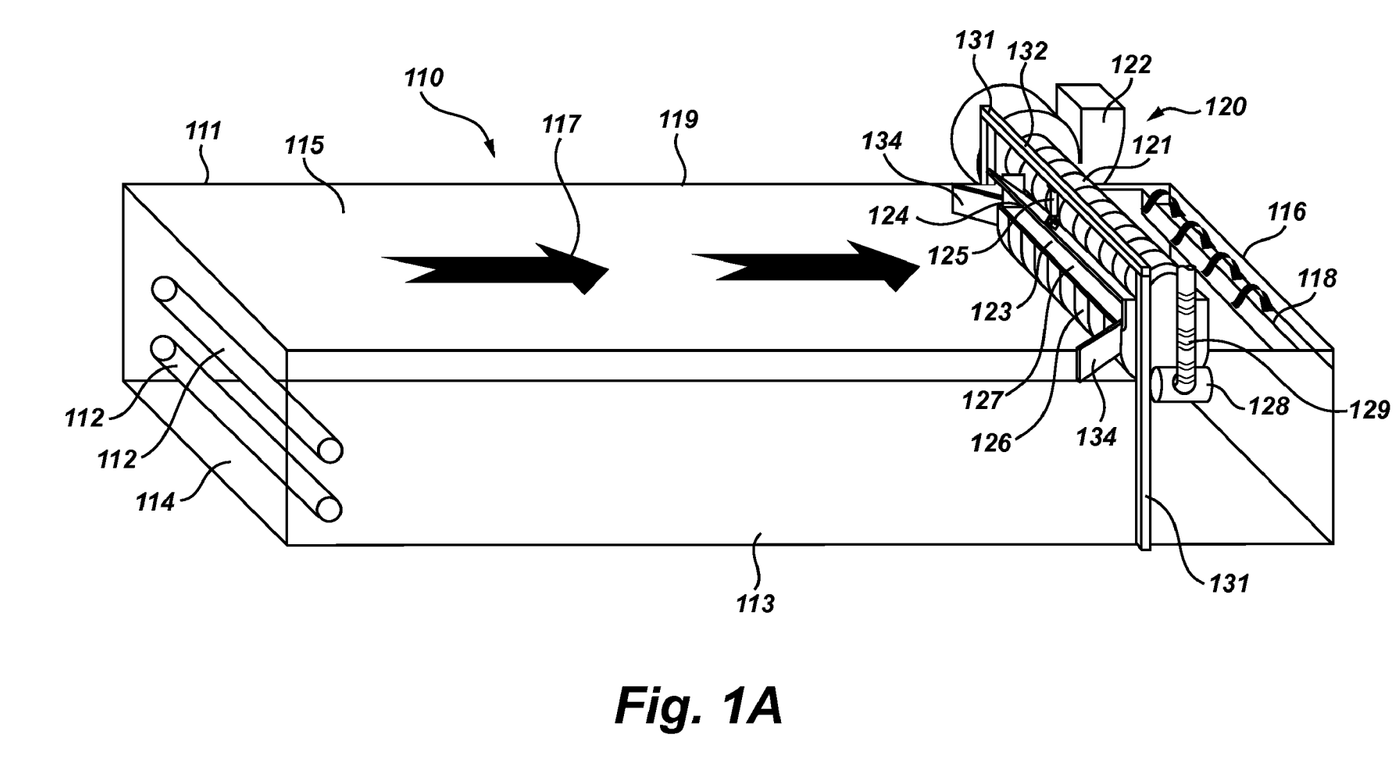
FIG. 1A is a diagram illustrating a perspective view of a DAF tank housing a sludge skimmer in accordance with an exemplary embodiment of the invention.

Referring to FIG. 1A, a diagram is shown illustrating a perspective view of a dissolved air flotation (DAF) tank 110 and a skimmer device 120 in accordance with an exemplary embodiment of the invention. As shown, the exemplary DAF tank 110 comprises a DAF tank housing 111 adapted to hold a fluid body 115 containing suspended matter that is desired to be removed from the fluid body 115. By way of example only, the DAF tank may be 20 feet (approximately 6.1 meters) long measured from a proximal end 114 to a distal end 116, 8 feet (approximately 3.7 meters) wide and 4 feet (approximately 1.2 meters) deep. The fluid body 115 may be waste water contaminated by suspended matter such as biological sludge, algae, fibers or other particulate contaminants introduced during various processes such those carried out at paper mills. One or more inlet pipes, labeled generally as 112, are disposed at the proximal end 114 of the DAF tank 110. The inlet pipes 112 are responsible for releasing waste water and microscopic air bubbles into the fluid body 115 contained in the DAF tank 110. These bubbles adhere to the suspended matter and carry the suspended matter to the surface of the fluid body 115 thereby forming a sludge layer near the surface of the fluid body 115. The skimmer device 120 is housed toward a distal end 116 of the DAF tank 110 and is responsible for removing the sludge layer from the surface of the underlying fluid body 115. The skimmer device 120 may be mounted to sidewalls 113 and 119 of the DAF tank 110 by way of one or more height adjustable bolts (not shown) or similar mounting mechanisms. The skimmer device 120 comprises a substantially cylindrical air duct 121. At a first end, the air duct 121 is connected to an air blower 122 which generates negative pressure to draw airflow through the air duct 121. By way of example only, the air blower 122 may be a NYB Blower (series 20 with 194 DH, 1980CFM, 2" SP, 1.1 BHP). The skimmer device 120 further comprises a separation chamber 126 for collecting sludge. The separation chamber 126 is connected at one end to a pump 128 for discharging sludge from the separation chamber 126. By way of example only, the pump 128 may be an air-powered diaphragm pump, such as that carried by McMaster-Carr (Part Number: 9948K11). The pump 128 is also connected to an outlet pipe 129 through which the pump discharges the sludge to an external sludge tank (not shown). The separation chamber 126 is longitudinally connected to a lower inlet plate 127. When the skimmer device 120 is mounted within the DAF tank 110 the top surface of the lower inlet plate 127 may be oriented substantially parallel to the surface of the fluid body 115. The top surface of the lower inlet plate 127 is also configured to be positioned a sufficient distance above the surface of the fluid body 115 to prevent gravity from alone causing the fluid to flow over the lower inlet plate 127. In a preferred embodiment, the lower inlet plate 127 may be positioned to be 0.125 inches (approximately 0.32 centimeters) above than the surface of the fluid body, however it is noted that the lower inlet plate 127 may be approximately coplanar with the surface of the fluid body 115 or may be positioned more than 0.125 inches above the surface of the fluid body 115. A distal portion of the lower inlet plate 127 is positioned below the air duct 121, forming an inlet channel 123 through which sludge is lifted and blown from the surface of the fluid body 115 in to the skimmer device 120. The minimum distance (labeled as D1 in FIG. 1D) between the lower inlet plate 127 and the air duct 121 determines the maximum airflow velocity through the inlet channel 123. By way of example only, this distance may be approximately 0.5 inches (approximately 1.27 centimeters). The section of the air duct 121 associated with this minimum distance D1 may be considered an upper section of the inlet channel 123, while the lower inlet plate 127 may be considered a lower section of the inlet channel 123. As shown, the proximal end of the lower inlet plate 127 protrudes beyond the upper section of the inlet channel 123. The air duct 121 is also connected to the separation chamber 126 and is adapted to uniformly distribute airflow longitudinally along the length of the inlet channel 123. The skimmer device 120 also comprises an upper inlet plate 124 configured with the skimmer device 120 to extend the inlet channel 123. By way of example only, the upper inlet plate 124 may be pivotally attached to the air duct 121 by way of hinges or similar attachment mechanisms. The skimmer device 120 may have two or more modes of operation. In each mode the upper inlet plate 124 may have a specific orientation relative to the skimmer device 120. By way of example only, the desired modes of operation may include a skimming mode and an idling mode. When the skimmer device 120 is operated in the skimming mode the upper inlet plate 124 is rotated toward the surface of the fluid body 115, thereby narrowing the extended section of the inlet channel 123. When in the skimming mode, the proximal end of the upper inlet plate 124 protrudes past the proximal end of the lower inlet plate 127, thus being positioned directly over the surface of the fluid body 115. In this manner airflow velocity is increased in the extended section of the inlet channel 123 (including the area below the proximal end of the upper inlet plate 124). The increase in airflow velocity generates negative pressure in the extended section of the inlet channel 123. The negative pressure lifts the sludge that has built up near the proximal end of the lower inlet plate 127 and blows the lifted sludge in to the separation chamber 126. When the skimmer device 120 is in an idling mode the upper inlet plate 124 is rotated away from the surface of the fluid body 115, thereby opening the extended section of the inlet channel 123 and decreasing airflow velocity at the proximal end of the extended section of the inlet channel 123. The pivoting motion of the upper inlet plate 124 thus allows the extended portion of the inlet channel 123 to be opened or narrowed periodically, thereby allowing the airflow velocity and its negative pressure through the extended portion of inlet channel 123 to be controlled. The skimmer device 120 further comprises an actuator 125. By way of example only, the actuator 125 may be a linear actuator such as a pneumatic or hydraulic cylinder attached to an upper surface of the upper inlet plate 124. The actuator 125 may also be attached to a support structure which as shown in FIG. 1A may include a horizontal support member 132 and two vertical support members labeled generally as 131. The vertical support members 131 may be externally mounted to the side walls 113 and 119 of the DAF tank housing 111 respectively. The actuator 125 may be automatically controlled by an external control system (not shown). The actuator 125 is responsible for controlling the pivoting motion of the upper inlet plate 124. It is to be understood that any type of extension mechanism that allows the inlet channel 123 to be opened and narrowed may be contemplated without departing from the spirit and scope of the invention. As indicated by the arrow labeled as 117, the fluid body 115 moves from the proximal end 114 of the of the DAF tank housing 111 to the distal end 116 of the DAF tank housing 111. The movement of the fluid body 115 in this manner thus causes the sludge layer to build up at the proximal edge of the lower inlet plate 127 of the skimmer device 120. The exemplary DAF tank 110 may also house one or more buffer plates 134 for channeling the sludge layer towards the inlet channel 123 of the exemplary skimmer device 120. As discussed, the pivoting motion of the upper inlet plate 124 allows periodic opening or narrowing of the inlet channel 123, thereby allowing airflow velocity through inlet channel 123 to be controlled. The actuator 125 may be configured to adjust the position of the upper inlet plate 124 in a periodic fashion based on the flow rate of the fluid body 115 or the duration of time required for a sufficient amount of sludge to build up at the lower inlet plate 127 of the skimmer device 120. The actuator 125 may alternately operate in combination with timers and sensors, such as photo sensors, adapted to sense the amount of sludge that has built up in front of the lower inlet plate 127. In this manner the sensors may provide information to an external control system (not shown) capable of automatically determining when to lower (skimming) or raise (idling) the upper inlet plate 124. The DAF tank 110 also includes a water weir 118 located at the distal end 116 of the DAF tank 110. The water weir 118 extends from the first sidewall 113 to the second sidewall 119 of the DAF tank housing 111 and is disposed within the DAF tank housing 111 of the DAF tank 110 at a height sufficient for collecting clean fluid that flows beyond the skimmer device 120. The cleaned fluid is then discharged to a clean fluid tank through a pipe line (not shown).

Figure 1B:
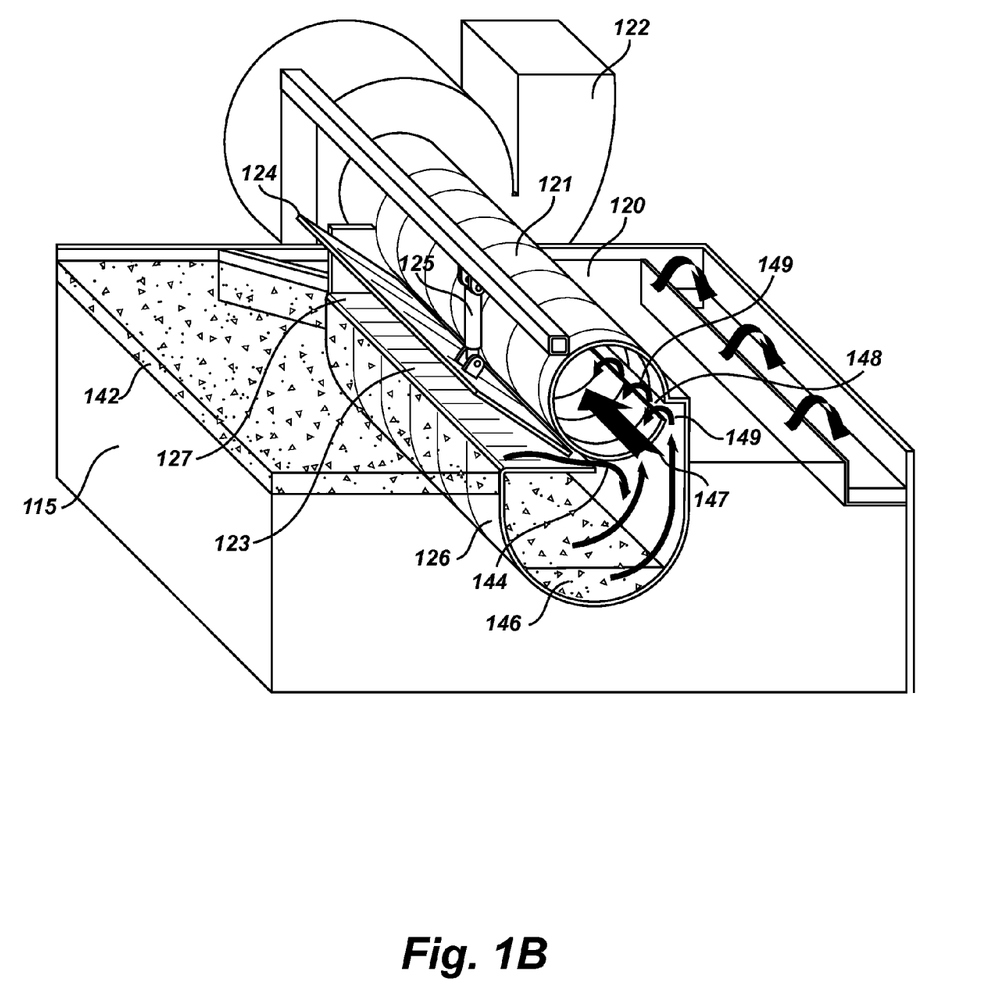
FIG. 1B is a diagram illustrating a perspective view of a section of the exemplary DAF tank and sludge skimmer of FIG. 1A.

Referring now to FIG. 1B a diagram is shown illustrating another perspective view of a section of the exemplary DAF tank and sludge skimmer of FIG. 1A. FIG. 1A illustrates the sludge layer 142 that floats near the surface of the fluid body 115. A portion of the sludge layer 142 located in front of the proximal end of the lower inlet plate 127 is lifted and blown across the lower inlet plate 127 and into the separation chamber 126 when sufficient negative air pressure exists above this portion of the sludge layer 142. The arrow labeled as 144 indicates the movement of this portion of the sludge layer 142 as it is drawn into the separation chamber 126. Sludge collects at the base of the separation chamber as indicated by element 146. Periodically, the pump 128 (shown in FIG. 1A) will extract the sludge 146 that accumulates in the separation chamber 126. Also shown in FIG. 1B is an arrow labeled as 147, indicating that the direction that air flows through the air duct 121 is generally towards the air blower 122. It is noted that the velocity of air through the air duct 121 decreases at points further away from the air blower 122. This is due to uniform airflow collection along the air duct 121 and airflow accumulation in the air duct 121 which has a substantially uniform diameter along its length. As shown, the air duct 121 also includes a cutout section 148 that allows air to be drawn into the air duct 121 from the separation chamber 126, as indicated by arrows labeled generally as 149, and ultimately from the inlet channel 123 of the skimmer device 120. The cutout section 148 may be shaped as a slot that is cut longitudinally along the length of the air duct 121 and increases in width at points further away from the air blower 122. The cutout section 148 may be shaped in this manner to compensate for the decrease in velocity of the airflow through the air duct 121 thereby providing uniform collection of airflow across the length of the inlet channel 123. It is to be understood that while in the exemplary embodiment the air collection is kept uniform by way of the cutout section 148 of changing width, other methods for compensating for the reduction in airflow velocity through the air duct 121 may be contemplated. Such methods may include modifying the shape of the air duct 121 to be conical, or adding one or more additional air blowers to the opposite end of the air duct 121. These options are however less desirable than use of the cutout section 148 which is more cost effective.

Figure 1C:
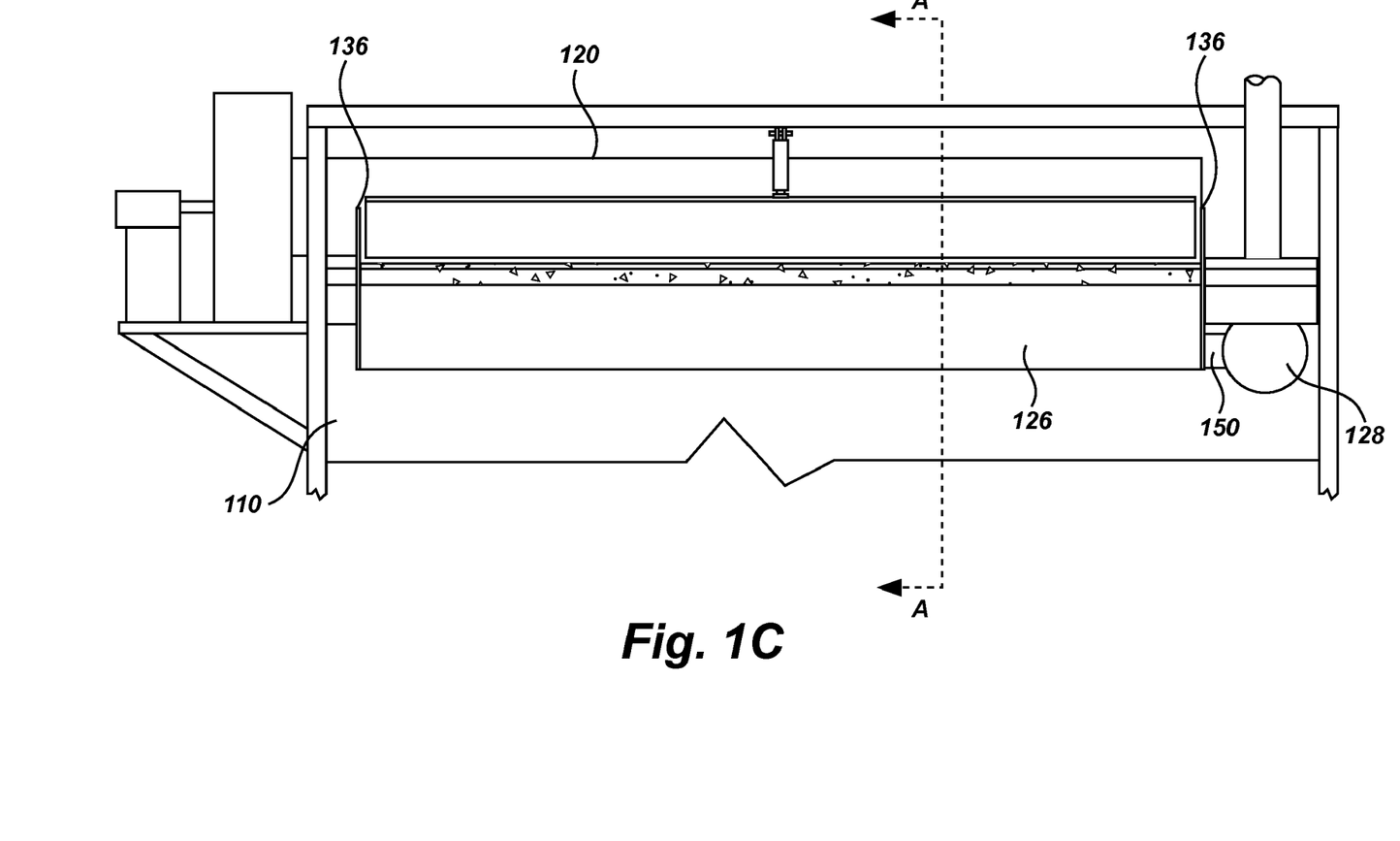
FIG. 1C is a diagram illustrating a front view of the exemplary DAF tank and sludge skimmer of FIG. 1A.

Referring now to FIG. 1C, a diagram is shown illustrating a front view of the exemplary DAF tank 110 and skimmer device 120 of FIG. 1A. As shown, the separation chamber 126 may be capped at each end by a sidewall labeled generally as 136. The skimmer device 120 further comprises a connecting pipe 150 that attaches to a bottom of one of the capped sidewalls 136 of the separation chamber 126. The connecting pipe 150 connects the separation chamber 126 to the pump 128 providing a conduit to allow removal of sludge that collects in the separation chamber 126.

Figure 1D:
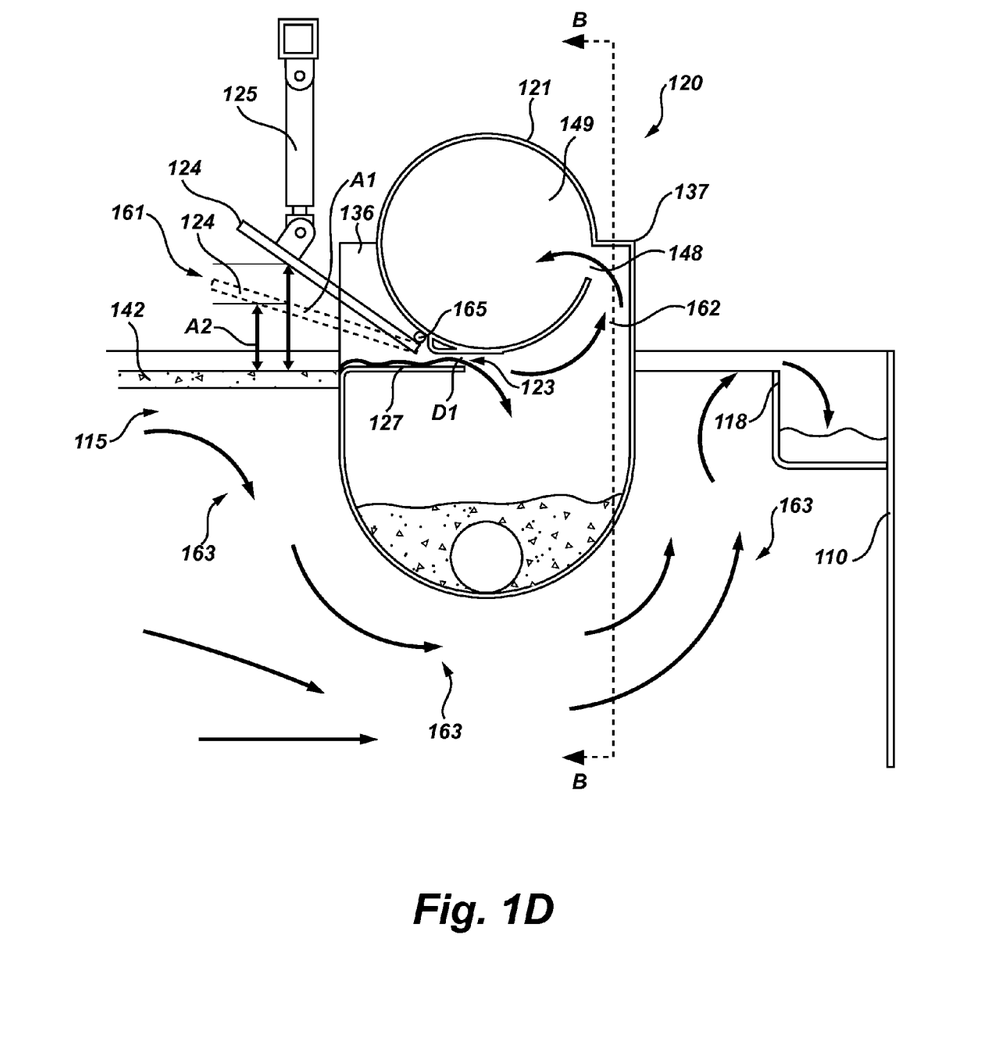
FIG. 1D is a diagram illustrating a section view of the exemplary DAF tank and sludge skimmer of FIG. 1A taken along line A-A, as indicated in FIG. 1C.

Referring now to FIG. 1D, a diagram is shown illustrating a section view of the exemplary DAF tank 110 and skimmer device 120 of FIG. 1A taken along line A-A, as indicated in FIG. 1C. As shown, the cutout section 148 allows air to be drawn from the inlet channel 123 as indicated by arrow 161, through the separation chamber 126 as indicated by arrow 162 and into the air duct 121 as indicated by arrow 149. The contour of the cutout section 148 allows the airflow at the inlet channel 123 to be substantially uniform along the longitudinal length of the inlet channel 123. Since the sludge layer 142 will tend to build up at the proximal edge of the lower inlet plate 127 in a uniform manner, it is beneficial to remove the sludge at a uniform rate along the longitudinal length of the inlet channel 123 so as to minimize the amount of the underlying fluid (such as water) that is drawn in with the sludge. Maintaining a high concentration of sludge is beneficial since it reduces the overall volume of removed matter and reduces the load on dewatering equipment that further separates the underlying fluid from the sludge. In certain environments the sludge layer 142 may build up at the proximal edge of the lower inlet plate 127 in a non-uniform manner. It is noted that in such environments the contour of the cutout section 148 may be modified to distribute air flow in accordance with the manner in which the sludge layer 142 builds up at the proximal edge of the lower inlet plate 127. FIG. 1D also illustrates the flow of the underlying fluid in the DAF tank 110. As indicated by the arrows labeled generally as 163, the underlying fluid flows from the proximal end 114 of the DAF tank 110 toward the distal end 116 of the DAF tank 110, flowing under the skimmer device 120. As shown, the sludge layer 142 has been removed from fluid body 115 on the distal side of the skimmer device 120, allowing the underlying fluid to flow over the water weir 118 in a decontaminated state. The decontaminated fluid may then be discharged from the DAF tank 110 through another connecting pipe to a clean fluid tank (not shown). By way of example only, the separation chamber 126 and lower inlet plate 127 are formed from bent sheet metal, having a thickness of 0.0625 inches (approximately 0.16 centimeters) and may be capped at each end by one of the sidewalls 136. By way of example only, each sidewall 136 may be a steel plate having a thickness of 0.25 inches (approximately 0.64 centimeters). Each sidewall 136 may also have a semi-circular cutout section located near the top of the sidewall, the semi-circular cutout section being shaped to receive air duct 121. The sidewalls 136 may be welded to the ends of the bent sheet metal used to form the separation chamber 126 and lower inlet plate 127. The separation chamber 126 and the lower inlet plate 127 may alternately be formed as separate components that are fixedly attached for example by welding the components together. The air duct 121 may also be formed from bent sheet metal having, for example, a thickness of 0.0625 inches (approximately 0.16 centimeters) and may be attached to the separation chamber 126 along a seam labeled as 137. The air duct 121 may be removably attached to the separation chamber 126 by way of one or more bolts (not shown). Rubber seals (not shown) may be used to prevent air leakage from the air duct 121 when placed onto the semi-circular cutout section of each of the sidewalls 136 of the separation chamber 126.

FIG. 1D also illustrates the hinge mechanism 165 that pivotally attaches the upper inlet plate 124 to the air duct 121. It is noted that a plurality of hinge mechanisms 165 may be employed. The hinge mechanism 165 allows the upper inlet plate 124 to pivotally rotate about a section of the air duct 121 to cause an opening or narrowing of the extended section of the inlet channel 123 (as discussed, the extended section of the inlet channel 123 includes the area below the upper inlet plate 124). In the exemplary embodiment the actuator 125 may be configured to rotate the upper inlet plate 124 between a first position in which the upper inlet plate 124 is considered to be in the idling position and a second position in which the upper inlet plate 124 is considered to be in the skimming position. The upper inlet plate 124 is shown with solid lines in the first or idling position at an angle labeled as A1 measured from the upper surface of the sludge layer. The upper inlet plate 124 is shown with dashed lines in the second or skimming position at an angle labeled as A2 measured from the upper surface of the sludge layer. The angle A1 associated with the idling position is chosen to be sufficiently large to prevent the sludge and underlying fluid from being lifted over the lower inlet plate 127, even while the air blower 122 is actively drawing in air. By way of example only, the angle A1 may be 60 degrees. The angle A2 associated with the second or skimming position is chosen to allow the airflow velocity at the proximal edge of the lower inlet plate 127 to be sufficiently fast to lift the sludge over the lower inlet plate 127 and blow the sludge through the inlet channel 123 and into the separation chamber 126 while the air blower 122 is actively drawing in air. By way of example only, angle A2 may be 15 degrees. It is noted that the angle A2, will be dependent on a number of factors including the flow capacity of the air blower 122 and the depth of the sludge layer 142. However, since the angle A2 is not fixed, only a maximum flow capacity of the air blower 122 must be determined prior to installation of the skimmer device 120. The desired airflow velocity may be achieved by calibrating the angles A1 and A2 during or after installation of the skimmer device 120. The maximum flow capacity of the air blower 122 may be determined based on a maximum desired sludge layer depth, the known longitudinal length of the inlet channel 123 and the minimum distance, labeled as D1, between the distal end of the lower inlet plate 127 and the air duct 121. The maximum flow capacity of the air blower 122 may be determined by the following Equation (1):

$$Q = A \times V_{max} \qquad (1)$$

In the preceding Equation (1), Q represents the flow capacity of the blower; A represents the area of the inlet channel 123 which is determined by multiplying the length of the inlet channel 123 by the distance D1; $V_{max}$ represents the maximum desired airflow velocity at the narrowest section (having a distance D1) of the inlet channel 123. According to the Bernoulli Equation, $V_{max}$ is determined by:

$$H = (V_{max}/4005)^2 \qquad (2)$$

In the preceding Equation (2), H represents the maximum lifting height of the sludge layer 142, in inches. $V_{max}$ represents the corresponding airflow velocity required for the height of lifting in Feet Per Minute FPM. As discussed, since the angle A2 is not fixed, the angle A2 of upper inlet plate 124 may then be calibrated depending in part on the actual depth of the sludge layer 142. The actuator 125 controls the position of the upper inlet plate 124. In operation, the actuator 125 may be configured to operate in a periodic manner, raising and lowering the upper inlet plate 124 between the skimming and idling positions, based on the flow rate of the fluid body 115 or the duration of time required for a sufficient amount of sludge to build up at the proximal edge of the lower inlet plate 127 of the skimmer device 120. The periodicity may be calibrated during or after installation of the skimmer device 120 in a DAF tank.

Figure 1E:
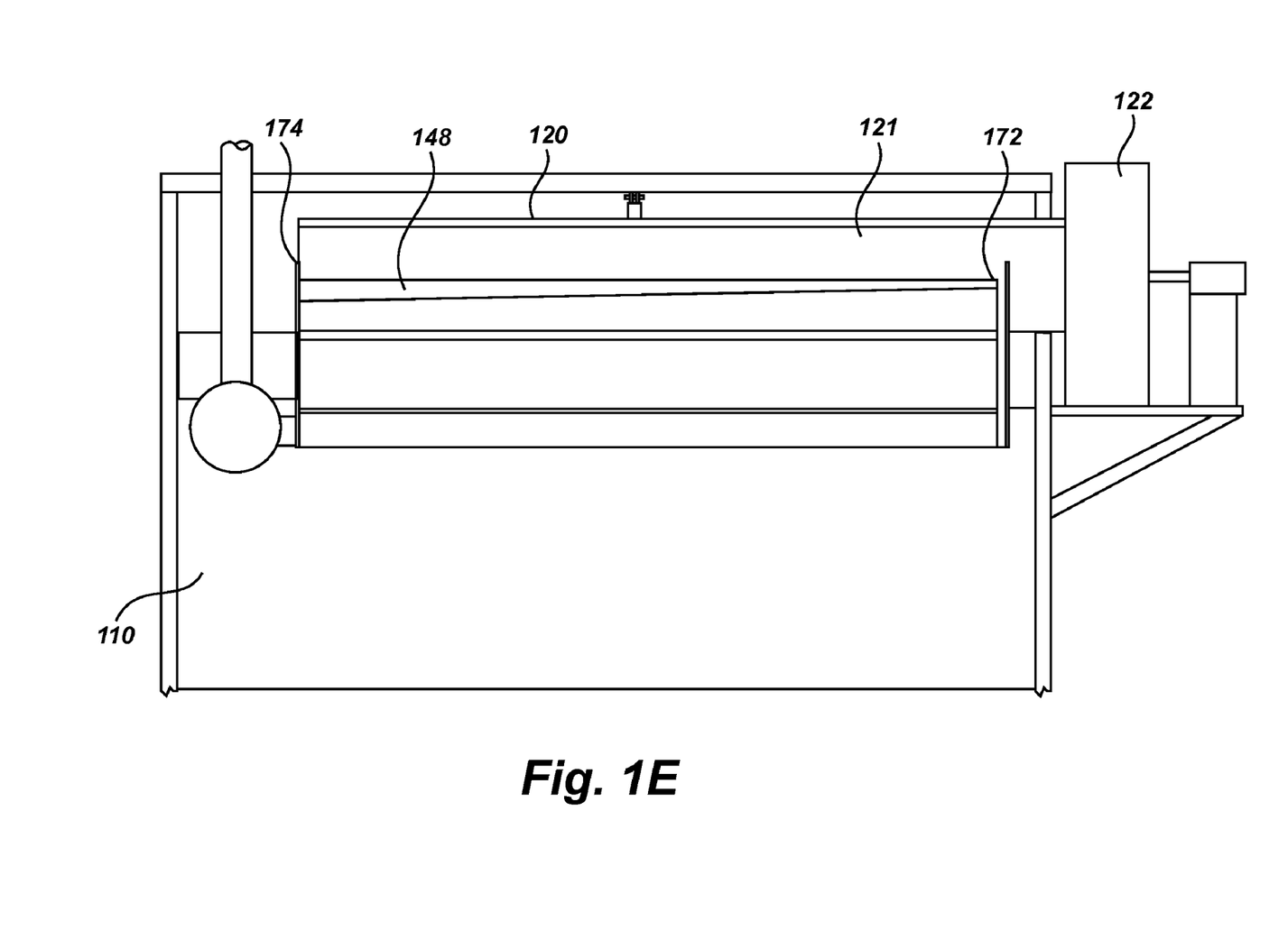
FIG. 1E is a diagram illustrating a section view of the DAF tank and sludge skimmer of FIG. 1A taken along line B-B, as indicated in FIG. 1D.

Referring now to FIG. 1E, a diagram is shown illustrating a section view of the DAF tank 110 and skimmer device 120 of FIG. 1A taken along line B-B, as indicated in FIG. 1D. FIG. 1E illustrates the change in width of the cutout section 148 that is responsible for providing uniform airflow across the longitudinal length of the inlet channel 123 of the skimmer device 120. As shown, the slot-shaped cutout section 148 has a smaller width at a first end labeled as 172 (closer to the air blower 122) and increases in width towards a second end 174. By way of example only, the air duct 121 may be approximately 6 feet (approximately 1.8 meters) in length and 11 inches (approximately 0.28 meters) in diameter. The slot-shaped cutout section 148 may be approximately 0.8 inches (approximately 2 centimeters) in width at the first end 172 and increase to 5 inches (approximately 12.7 cm centimeters) in width at the second end 174.

The width of the slot-shaped cutout section 148, may be calculated at a given point by the following Equation (3):

$$W_I = R/V_I \qquad (3)$$

In the preceding Equation (3), $W_I$ represents the width of the slot at a distance I; R represents the rate of uniform airflow collection in units of Cubic Feet per Minute (CFM)/(Foot) FT which is a constant along the air duct 121; $V_I$ represents the airflow velocity inside the air duct 121 at the distance I in units of Feet per Minute (FPM).

Figure 2:
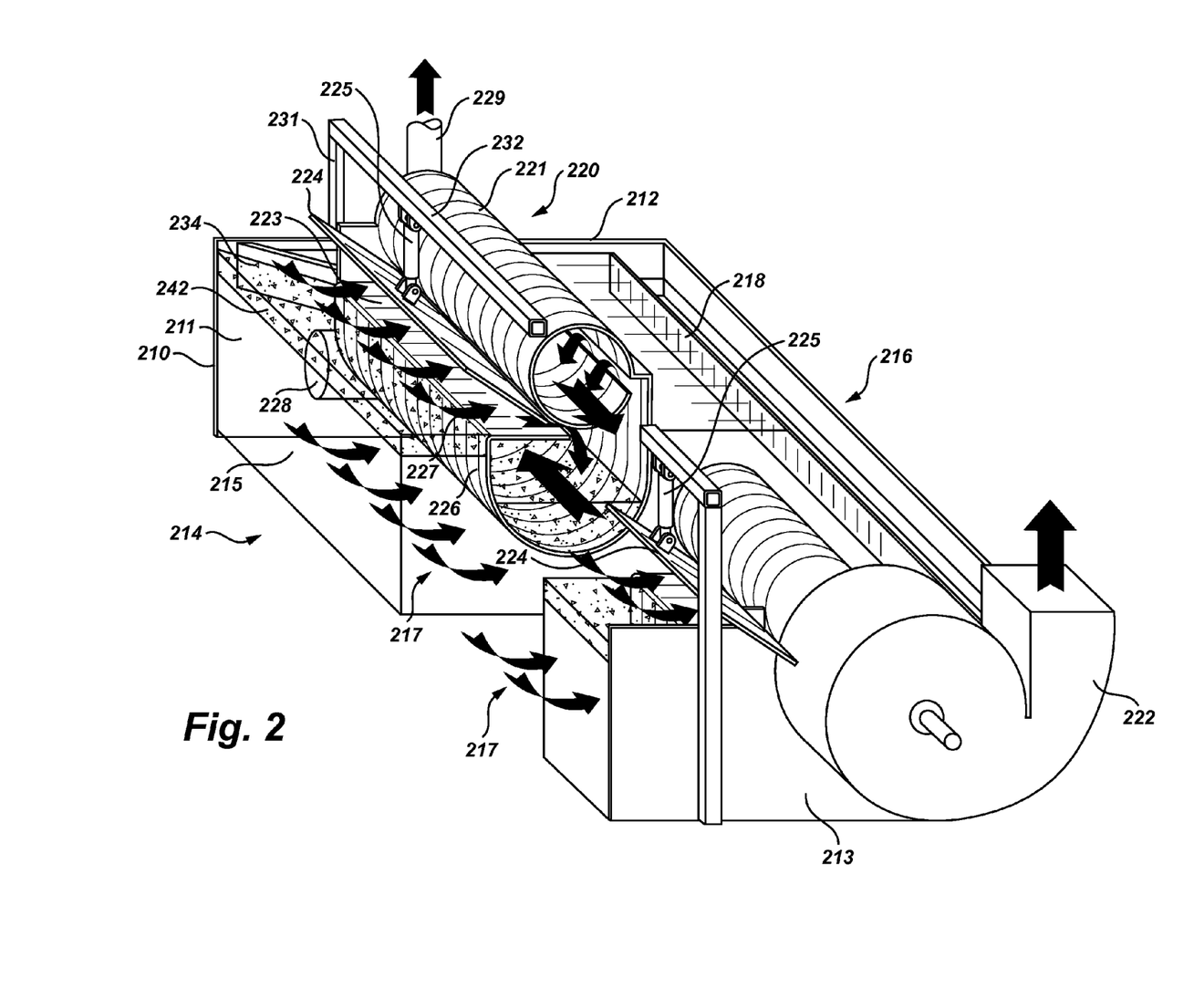
FIG. 2 is a diagram illustrating a perspective view of a DAF tank housing a sludge skimmer in accordance with another exemplary embodiment of the invention.

Referring now to FIG. 2, a diagram is shown illustrating a perspective view of a DAF tank 210 and skimmer device 220 in accordance with another exemplary embodiment of the invention. As shown, the exemplary DAF tank 210 comprises a DAF tank housing 211 adapted to hold a fluid body 215 containing suspended matter that is desired to be removed from the fluid body 215. The fluid body 215 may be waste water contaminated by suspended matter such as biological sludge, algae, fibers or other particulate contaminants introduced during various processes such those carried out at paper mills. One or more inlet pipes (not shown), are disposed at a proximal end 214 of the DAF tank 210. The inlet pipes are responsible for releasing waste water and microscopic air bubbles into the fluid body 215 contained in the DAF tank 210. These bubbles adhere to the suspended matter and carry the suspended matter to the surface of the fluid body 215 thereby forming a sludge layer 242 near the surface of the fluid body 215. The skimmer device 220 is housed toward a distal end 216 of the DAF tank 210 and is responsible for removing the sludge layer 242 from the surface of the underlying fluid body 215. The skimmer device 220 comprises a substantially cylindrical air duct 221 adapted to uniformly distribute airflow longitudinally along an inlet channel 223. The air duct 221 is connected to an air blower 222 at one end which generates negative pressure to draw airflow through the air duct 221. The skimmer device 220 further comprises a separation chamber 226 for collecting sludge. The separation chamber 226 is connected at one end to a pump 228. The pump 228 is also connected to an outlet pipe 229 through which the pump discharges the sludge to an external sludge tank (not shown). The separation chamber 226 is also longitudinally connected to a lower inlet plate 227. When the skimmer device 220 is mounted within the DAF tank 210, the top surface of the lower inlet plate 227 may be oriented substantially parallel to the surface of the fluid body 215. The top surface of the lower inlet plate 227 is also configured to be positioned a sufficient distance above the surface of the fluid body 215 to prevent gravity from alone causing the fluid to flow over the lower inlet plate 227. A distal portion of the lower inlet plate 227 is positioned below the air duct 221, forming the inlet channel 223 through which sludge is lifted and blown from the surface of the fluid body 215 in to the skimmer device 220. The minimum distance between the lower inlet plate 227 and the air duct 221 determines the maximum airflow velocity through the inlet channel 223. By way of example only, this distance may be approximately 0.5 inches (approximately 1.27 centimeters). The section of the air duct 221 associated with this minimum distance may be considered the upper section of the inlet channel 223, while the distal end of the lower inlet plate 227 may be considered the lower section of the inlet channel 223. As shown, the proximal end of the lower inlet plate 227 protrudes beyond the upper section of the inlet channel 223. The lower inlet plate 227 and separation chamber 226 may be formed as a single structure or as multiple components in a similar manner to that discussed with regard to the embodiment of FIG. 1A. The skimmer device 220 may also comprise a plurality of upper inlet plates, labeled generally as 224, configured with the skimmer device 220 to extend the inlet channel 223. By way of example only, the upper inlet plates 224 may be pivotally attached to the air duct 221 by way of hinges or similar attachment mechanisms. The skimmer device 220 may have two or more modes of operation. In each mode of operation the upper inlet plates 224 may each have a specific orientation relative to the skimmer device 220. By way of example only, the desired modes of operation may include a skimming mode and an idling mode. When the skimmer device 220 is operated in the skimming mode each of the upper inlet plates 224 is rotated toward the surface of the fluid body 115, thereby narrowing the extended section of the inlet channel 123. When operated in the skimming mode, the proximal end of each of the upper inlet plates 224 will protrude past the proximal end of the lower inlet plate 227, thus being positioned directly over the surface of the fluid body 115. In this manner the airflow velocity is increased in the extended section of the inlet channel 223 (including the area below the proximal end of each of the upper inlet plates 224). The increase in airflow velocity generates negative pressure in the extended section of the inlet channel 223. The negative pressure lifts the sludge that has built up near the proximal end of the lower inlet plate 227 and blows the lifted sludge in to the separation chamber 226. When the skimmer device 220 is operated in the idling mode the upper inlet plates 224 are rotated away from the surface of the fluid body 215, thereby opening the extended section of the inlet channel 223 and decreasing airflow velocity at the proximal end of the extended section of the inlet channel 223. While two upper inlet plates 224 are shown in FIG. 2, it is to be understood that any number of upper inlet plates 224 may be employed depending on application specific factors such as the length of the skimmer device 220 and desired flexibility of operation. The pivoting motion of the upper inlet plates 224 thus allows the extended portion of the inlet channel 223 to be opened or narrowed periodically, thereby allowing the airflow velocity and its negative pressure through the extended portion of inlet channel 223 to be controlled. Use of a plurality of upper inlet plates 224 provides greater operator control of the airflow velocity across the longitudinal length of the inlet channel 223 of the skimmer device 220. The exemplary skimmer device 220 further comprises a plurality of actuators, labeled generally as 225. By way of example only, each actuator 225 may be a linear actuator such as a pneumatic or hydraulic cylinder attached to an upper surface of one of the upper inlet plates 224. While two actuators 225 are shown in the exemplary embodiment, it is to be understood that any number of actuators 225 may be employed depending in part on the number of upper inlet plates 224 used. Each actuator 225 may also be attached to a support structure which as shown in FIG. 2 may include a horizontal support member 232 and two vertical support members labeled generally as 231. The vertical support members 231 may be externally mounted to the side walls 212 and 213 of the DAF tank housing 211 respectively. The actuators 225 may be automatically controlled by an external control system (not shown). It is to be understood that any type of extension mechanism that allows the inlet channel 223 to be opened and narrowed may be contemplated without departing from the spirit and scope of the invention. As indicated by the arrows labeled generally as 217, the fluid body 215 moves from the proximal end 214 of the of the DAF tank housing 211 to a distal end 216 of the of the DAF tank housing 211. The movement of the fluid body 215 in this manner thus causes the sludge layer 242 to build up at proximal edge of the lower inlet plate 227. The exemplary DAF tank 210 may also house one or more buffer plates 234 for channeling said sludge layer 242 towards the inlet channel 223 of the exemplary skimmer device 220. The actuators 225 are responsible for controlling the pivoting motion of the upper inlet plates 224. The actuators 225 may be configured to operate in a periodic fashion based on the flow rate of the fluid body 215 or the duration of time required for sufficient sludge to build up at the lower inlet plate 227 of the skimmer device 220. The actuators 225 may alternately operate in combination with timers and sensors, such as photo sensors, adapted to sense the amount of sludge that has built up in front of the lower inlet plate 227. In this manner the sensors may provide information to an external control system (not shown) capable of automatically determining when to lower (skimming) or raise (idling) each of the upper inlet plates 224. The DAF tank 210 also includes a water weir 218 located at the distal end 216 of the DAF tank 210. The water weir 218 extends from a first sidewall 212 to a second sidewall 213 of the DAF tank housing 211 and is adapted to collect clean water that flows beyond the skimmer device 220.

Figure 3A:
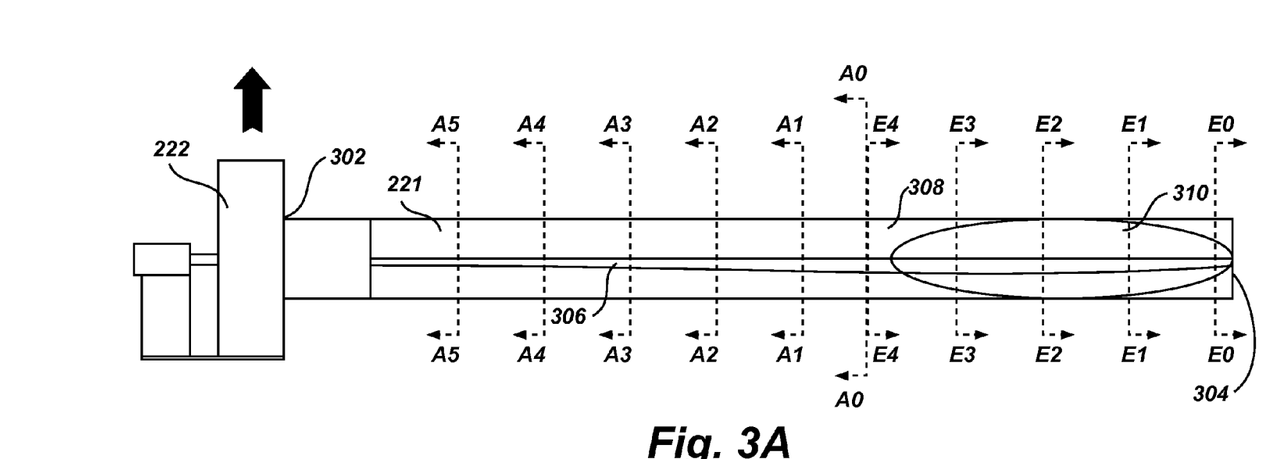
FIG. 3A is a diagram illustrating a front view of an air duct and air blower in accordance with the exemplary skimmer of FIG. 2.
Figure 3B:
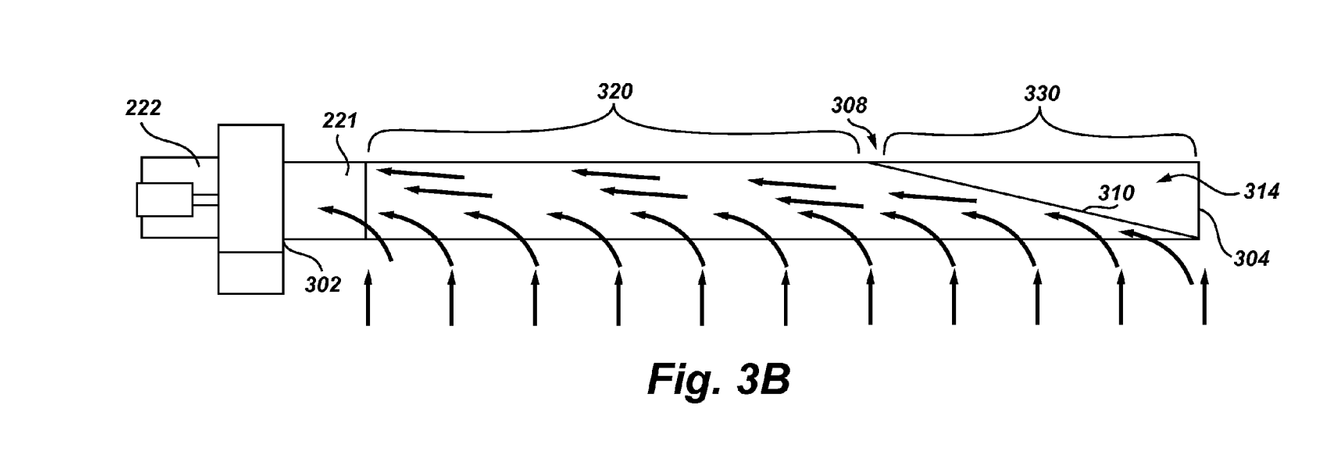
FIG. 3B is a diagram illustrating a top view of the exemplary air duct and air blower of FIG. 3A.

Referring now to FIGS. 3A and 3B, diagrams are shown illustrating front and top views of the air duct 221 and air blower 222 of FIG. 2. The air duct 221 is connected to an air blower 222 at a first end 302 which generates airflow through the air duct 221. By way of example only the air blower 122 may be a NYB Blower (series 20 with 194 DH, 1980CFM, 2" SP, 1.1 BHP). As discussed, the air duct 221 is substantially cylindrical in shape. By way of example only, the air duct 221 may be approximately 10 feet (approximately 3 meters) in length and 11 inches (approximately 0.28 meters) in diameter and may be comprised of bent sheet metal having, for example, a thickness of approximately 0.0625 inches. The air duct 221 also includes a slot-shaped cutout section 306 for uniformly distributing airflow along the length of the inlet channel 223. The cutout section 306 is cut substantially along the length of the air duct 221. In the exemplary embodiment, the cutout section 306 may increase in size along a first section 320 of the air duct 221, increasing in width from the first end 302 of the air duct 221 to an intermediate point 308 located approximately 6 feet (approximately 1.8 meters) from the first end 302. The cutout section 306 is shaped in this manner to achieve uniform airflow across a corresponding length of the inlet channel 223 of the skimmer device 220. In particular, the discussed increase in width compensates for the decrease in velocity of the airflow as it moves from the first end 302 of the air duct 221 to the intermediate point 308. The change in size of the cutout section 306 and the change in velocity of the airflow through the first section 320 of the air duct 221 will now be discussed with reference to FIG. 4A-4F.

Figure 4A:
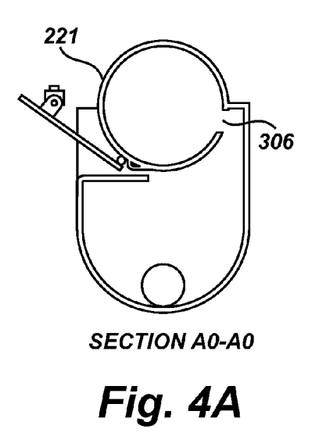
FIG. 4A is a diagram illustrating a section view of the skimmer of FIG. 2, taken along line A0-A0, as indicated in FIG. 3A.
Figure 4B:
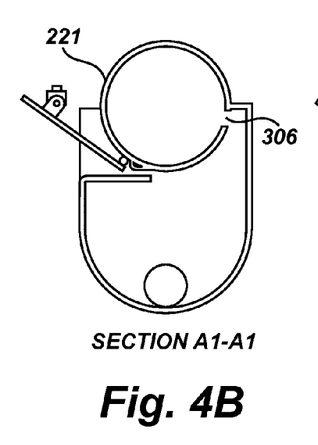
FIG. 4B is a diagram illustrating a section view of the skimmer of FIG. 2, taken along line A1-A1, as indicated in FIG. 3A.
Figure 4C:
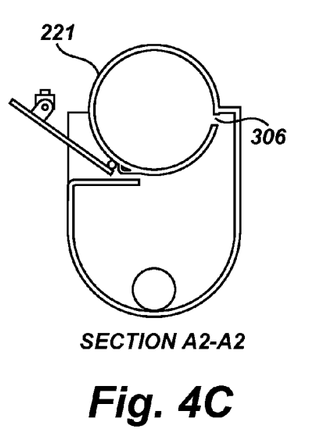
FIG. 4C is a diagram illustrating a section view of the skimmer of FIG. 2, taken along line A2-A2, as indicated in FIG. 3A.
Figure 4D:
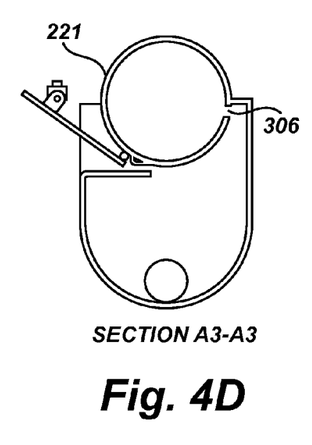
FIG. 4D is a diagram illustrating a section view of the skimmer of FIG. 2, taken along line A3-A3, as indicated in FIG. 3A.
Figure 4E:
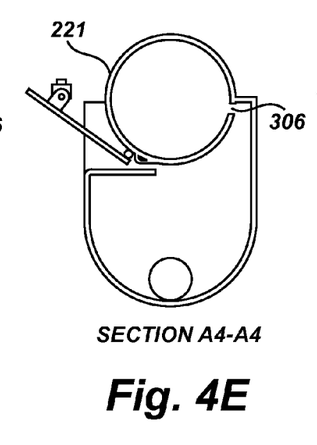
FIG. 4E is a diagram illustrating a section view of the skimmer of FIG. 2, taken along line A4-A4, as indicated in FIG. 3A.
Figure 4F:
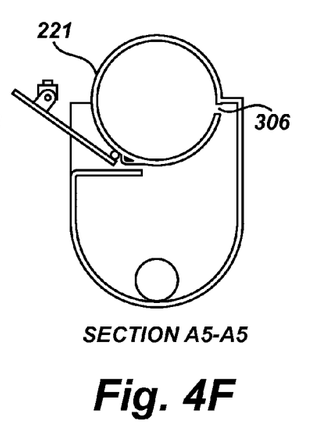
FIG. 4F is a diagram illustrating a section view of the skimmer of FIG. 2, taken along line A5-A5, as indicated in FIG. 3A.

Referring now to FIG. 4A-4F, diagrams are shown illustrating section views of the first section 320 of the air duct 221 of FIG. 2, as indicated in FIG. 3A. As shown, when moving from section view A5-A5 (located near the first end 302 of the air duct 221), as shown in FIG. 4F, to section view A0-A0 (located at the intermediate point 308 along the air duct 221) as shown in FIG. 4A, the velocity of the airflow decreases from approximately 4172 feet per minute (FPM) to approximately 1845 FPM. In order to compensate for this decrease in airflow velocity, the width of the slot-shaped cutout section 306 increases from approximately 0.8 inches (approximately 2 centimeters) at section A5-A5 of FIG. 4F to approximately 2 inches (approximately 5 centimeters) at section A0-A0. The additional section views A4-A4, A3-A3, A2-A2, and A1-A1, show in FIGS. 4E, 4D, 4C and 4B respectively, serve to illustrate the discussed relationship between airflow velocity and width of the cutout section 306.

Referring back to FIG. 3A and FIG. 3B, in the exemplary embodiment the cutout section 306 may be used in combination with another airflow control mechanism to provide the desired uniform airflow along the length of the inlet channel 223 of the skimmer device 220. This additional airflow control mechanism may in one embodiment be a buffer plate 310, which as shown in FIG. 3A is inserted into the second end 304 of the air duct 221. By way of example only, the buffer plate 310 may be substantially elliptical in shape. The buffer plate 310 restricts air from flowing through a section of the air duct 221, labeled as 314 in FIG. 3B. The section of the restricted space 314 increases towards the second end 304 of the air duct 221. The change in size of the cutout section 306 and the change in velocity of the airflow through section 330 of the air duct 221 will now be discussed with reference to FIG. 5A-5E.

Figure 5A:
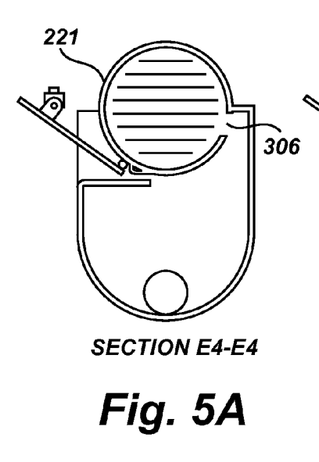
FIG. 5A is a diagram illustrating a section view of the skimmer of FIG. 2, taken along line E4-E4, as indicated in FIG. 3A.
Figure 5B:
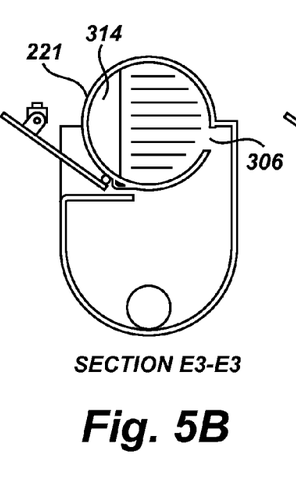
FIG. 5B is a diagram illustrating a section view of the skimmer of FIG. 2, taken along line E3-E3, as indicated in FIG. 3A.
Figure 5C:
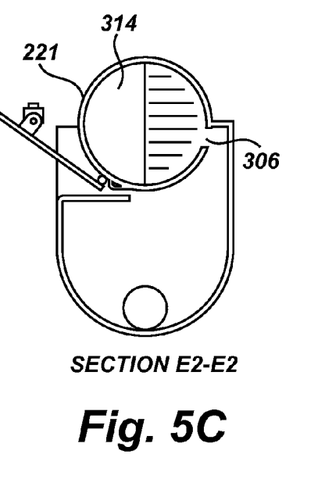
FIG. 5C is a diagram illustrating a section view of the skimmer of FIG. 2, taken along line E2-E2, as indicated in FIG. 3A.
Figure 5D:
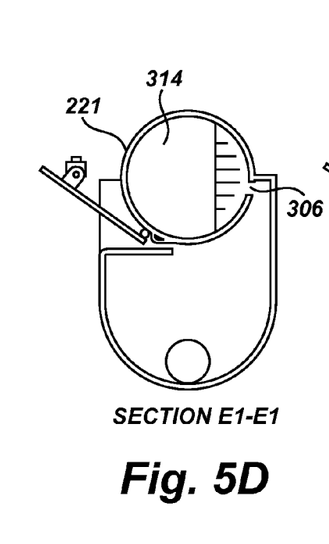
FIG. 5D is a diagram illustrating a section view of the skimmer of FIG. 2, taken along line E1-E1, as indicated in FIG. 3A.
Figure 5E:
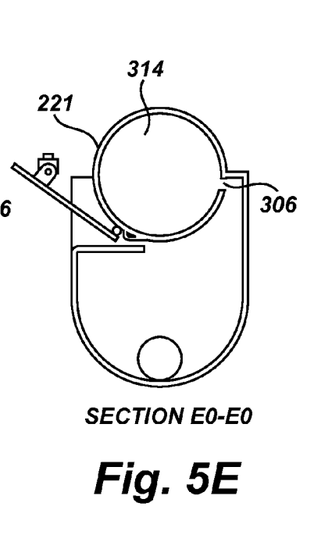
FIG. 5E is a diagram illustrating a section view of the skimmer of FIG. 2, taken along line E0-E0, as indicated in FIG. 3A.

Referring now to FIG. 5A-5E, diagrams are shown illustrating section views of section 330 of the skimmer device 220 of FIG. 2, as indicated in FIG. 3A. As discussed, the velocity of air through the air duct 221 decreases when moving from the first end 302 to the second end 304 of the air duct. The previously discussed slot-shaped cutout section 306 increases in width through the first section 320 of the air duct 221 to compensate for the reduction in velocity. However, insertion of the buffer plate 310 increases airflow velocity as it moves from the intermediate point 308 to the second end 304 of the air duct 221. Accordingly, the cutout section 306 does not need to increase in width through section 330 of the exemplary air duct 221. When moving from section view E4-E4 (located at intermediate point 308 of the air duct 221), as shown in FIG. 5A, to section view E1-E1 (located at second end 304 of the air duct 221) as shown in FIG. 5D, the velocity of the airflow increases from approximately 1018 feet per minute (FPM) to approximately 1292 FPM. The buffer plate 310 is able to achieve this increase in airflow velocity due to the increase in cross-sectional area of the restricted space 314 towards the second end 304 of the air duct 221. The width of the slot accordingly decreases from approximately 2 inches (approximately 5 centimeters) at section E4-E4, as shown in FIG. 5A to approximately 0.94 inches (approximately 2.4 centimeters) at section E0-E0 of FIG. 5E. The additional section views E3-E3, E2-E2, and E1-E1, shown in FIGS. 5B, 5C and 5D respectively, serve to illustrate the discussed relationship between airflow velocity, the cross-sectional area of the restricted space 314 and the width of the cutout section 306. For any particular skimmer device, the width of the slot-shaped-cutout section 306 has a maximum size restriction related to the diameter of the air duct 221. For longer skimmer devices, the slot width may not be able to be increased to a size to effectively control airflow velocity along the entire length of the air duct 221. It is noted that other methods for compensating for the velocity reduction in the airflow through the duct may also be employed. Such methods may include modifying the shape of the air duct to be conical or adding one or more additional air blowers to the opposite end of the air duct 221. These methods may be used alone or in combination with the previously described cutout section 306 or buffer plate 310.

Operation of the Skimmer Device

The skimmer device 120 of the exemplary embodiment may be operated in the following exemplary manner. The skimmer device 120 may be first mounted within a DAF tank such as DAF tank 110 of FIG. 1A. The skimmer device 120 is oriented in the DAF tank 110 such that the top surface of the lower inlet plate 127 is located at approximately the same level as the surface of the fluid body 115. It is noted that the surface of the fluid body 115 and the surface of the sludge layer are approximately coplanar since the sludge is typically substantially submerged below the surface of the fluid body 115. The top surface of the lower inlet plate 127 is positioned at a sufficient level to prevent both water and sludge from being drawn into the separation chamber 126 of the skimmer device 120 by gravity alone. At a next step, the actuator 125 raises the upper inlet plate 124 to the idling position such that when the air blower 122 is turned on, the airflow velocity at the front edge of the lower inlet plate 127 is sufficiently slow to prevent sludge from being lifted from the surface of the fluid body 115. At a next step the air blower 122 is turned on causing air to be drawn in from the atmosphere through the inlet channel 123. The actuator 125 subsequently lowers the upper inlet plate 124 to the skimming position. Two timers may alternately be started at this point, the first being set to a skimming time corresponding to the duration of time with which the skimmer device 120 is typically able to remove sludge that has built up in front of the lower inlet plate 127. With the upper inlet plate 124 in the skimming position, the airflow velocity below the proximal end of the extended portion of the inlet channel 123 increases to a level sufficient to lift the sludge over the lower inlet plate 127 and blow the sludge through the inlet channel 123 and into the separation chamber 126. As the sludge moves into the separation chamber 126, the velocity of airflow decreases enough to allow gravity to pull the sludge to the bottom of the separation chamber while the air continues to flow up through the cutout section 148, into the air duct 121 and then back to the atmosphere through the air blower 122. When the skimming timer expires, the actuator 125 is triggered to return the upper inlet plate 124 to the idling position. At approximately the same time, the idling timer is triggered to start timing. The idling timer is set to a waiting time consistent with the duration of time required for a sufficient amount of sludge to build up in front of the lower inlet plate 127. It is noted that the skimming and idling times may be predetermined or calibrated after the skimmer device 120 has been installed in a DAF tank to suit the operational capabilities of the DAF tank 110 and/or the application for which the device is being utilized. After the idling time has expired, the actuator 125 is triggered to lower the upper inlet plate 124 to the skimming position. At approximately the same time, the skimming timer is triggered to restart. The previous steps of skimming and idling are then repeated until the sludge has been removed from the DAF tank or the process is manually or automatically halted. In an alternate embodiment a sensor may be used to sense the amount of sludge has built up in front of the lower inlet plate 127. The sensor may then provide information to an external control system to determine when to lower or raise the upper inlet plate 124. The sensor may for example be a photo sensor. Throughout operation of the skimmer device 120, the pump 128 will turn on and off as necessary to discharge sludge that has collected in the separation chamber 126. It is noted that the skimmer device 220 of the exemplary embodiment of FIG. 2 may be operated in a similar manner. The additional upper inlet plates 224 and corresponding actuators 225 however provide the operator with greater control of the airflow velocity along the length of the inlet channel 223.

Thus, a method and device for removing floated matter such as sludge located near the surface of a fluid body is contemplated. The contemplated device requires few moving parts, requires less maintenance and can be manufactured at a lower cost relative to prior art sludge removal devices. The contemplated sludge removal device employs pneumatic force for drawing sludge into an inlet channel. The device is configured to provide uniform airflow across the inlet channel. The inlet channel may also include an adjustable section which can be positioned to allow the pneumatic force to lift sludge from the surface of the underlying fluid body in a periodic fashion. The uniform airflow and periodic operation of the device allows sludge of a high concentration (i.e. little fluid body dilution) to be collected.

While the foregoing invention has been described with reference to the above-described embodiments, various modifications and changes can be made without departing from the spirit of the invention. Accordingly, all such modifications and changes are considered to be within the scope of the appended claims.

What is claimed is:

1. A skimmer device comprising:
    a skimmer body, the skimmer body including:
        an outlet for attaching said skimmer body to an air blower;
        an elongated inlet channel, said elongated inlet channel further comprising an upper section and a lower section, said lower section protruding beyond said upper section;
        an airflow distribution mechanism, the airflow distribution mechanism adapted to provide substantially uniform airflow along said elongated inlet channel;
        a chamber for collecting matter drawn in through said elongated inlet channel; and
        an upper inlet plate positioned above said lower section of said elongated inlet channel, said upper inlet plate being of sufficient size to protrude beyond said protruding portion of the lower section.

2. The skimmer device of claim 1, further comprising a pump connected to said chamber, wherein said pump is configured to discharge matter collected in said chamber.

3. The skimmer device of claim 1, wherein said upper inlet plate is pivotally attached to said skimmer body.

4. The skimmer device of claim 3, further comprising:
    a means for rotating said pivotally attached upper plate wherein rotation of said pivotally attached upper plate will cause a change in airflow velocity below said upper inlet plate.

5. The skimmer device of claim 3, wherein said pivotally adjustable upper inlet plate is oriented in such a way that rotating said pivotally attached upper inlet plate towards said lower section of said elongated inlet channel will cause an increase in airflow velocity below said upper inlet plate.

6. The skimmer device of claim 4, wherein said means for rotating said pivotally attached upper plate is at least one actuator, said actuator having a first end connected to an upper surface of said upper inlet plate and a second end configured to be connected to an external support structure.

7. The skimmer device of claim 1, wherein said airflow distribution mechanism comprises an air duct having at least one cutout section, said at least one cutout section shaped to provide said substantially uniform airflow along said elongated inlet channel.

8. The skimmer device of claim 7, wherein said outlet is located at a first end of said air duct, and wherein said at least one cutout section is a slot-shaped cutout having a width that increases from the first end of the air duct towards a second end of the air duct.

9. The skimmer device of claim 7, wherein the chamber is an elongated chamber having a first connection to said elongated inlet channel and a second connection to said air duct, said first and second connections positioned in such a way that gravity causes said matter drawn in through the elongated inlet channel to fall to a base of said chamber, and air drawn in through said elongated inlet channel is channeled through said chamber to the at least one cutout section of the air duct.

10. The skimmer device of claim 9, wherein said first connection is positioned vertically lower than said second connection and said elongated chamber is positioned substantially vertically lower than said elongated inlet channel.

11. A method of removing sludge from a surface of a fluid body comprising:
    providing a skimmer device, the skimmer device having:
        a skimmer body, the skimmer body including:
            an outlet for attaching said skimmer body to an air blower;
            an elongated inlet channel having an upper section and a lower section, said lower section protruding beyond said upper section;
            an airflow distribution mechanism, the airflow distribution mechanism adapted to provide substantially uniform airflow along said elongated inlet channel;
            a chamber for collecting matter drawn in through said elongated inlet channel;
            an upper inlet plate attached to said skimmer body and positioned above the lower section of the elongated inlet channel, said upper inlet plate being of sufficient size to protrude beyond said protruding portion of the lower section;
    mounting said skimmer device inside a tank, so that an upper surface of said lower inlet plate is positioned above the surface of the fluid body;
    positioning said upper inlet plate to a first position such that airflow velocity below the protruding portion of the upper inlet plate is sufficiently slow to prevent sludge located at the front of the lower inlet plate from being lifted over the lower inlet plate;
    activating the blower to provide negative pressure along the elongated inlet channel;
    adjusting the upper inlet plate to a second position such that the airflow velocity below the protruding portion of the upper inlet plate is sufficiently fast to cause sludge located at the front of the lower inlet plate to be lifted over the lower inlet plate and blown in to the chamber, said adjusting occurring after determining that said sludge located at the front of the elongated inlet plate has reached a first level;
    returning the upper inlet plate back to said first position after determining that said sludge located in front of the elongated inlet has been reduced to a second level;
    repeating said steps of adjusting and returning until said sludge has been removed from said fluid body.

12. The method of claim 11, wherein determining that said sludge has reached said first level is based on a first predetermined duration of time corresponding to an expected time required for the sludge to build up to a level sufficient to be removed without also removing a substantial amount of an underlying fluid.

13. The method of claim 11, wherein said determining that said sludge has reached said first and said second levels is manually determined by an operator during operation of the skimmer device.

14. The method of claim 11, wherein said determining that said sludge has reached said first level is based on information received from one or more sensors capable of determining sludge quantity.

15. The method of claim 12, wherein determining that said sludge has reached said second level is based on a second predetermined duration of time corresponding to an expected time required for the skimmer device to remove said sludge.

16. The method of claim 14, wherein said determining that said sludge has reached said second level is based on information received from one or more sensors capable of determining sludge quantity.

17. A device for removing floated sludge from a dissolved air flotation tank comprising:
   a skimmer body, the skimmer body including:
      an outlet for attaching said skimmer body to an air blower;
      an elongated inlet channel having a lower section and an adjustable upper section, wherein the adjustable upper section is adapted to cause a change in airflow velocity in front of the lower section when transitioned between a first position and a second position;
      an air duct having at least one cutout section, said at least one cutout section shaped to provide substantially uniform airflow along said elongated inlet channel; and
      a separation chamber having a first connection to the air duct and a second connection to the elongated inlet channel, the first and second connections positioned to allow sludge drawn in through said inlet channel to fall to a base of said separation chamber while air drawn in through said elongated inlet channel will be channeled through said separation chamber to the at least one cutout section of the air duct.

18. The skimmer device of claim 17, wherein said adjustable upper section of said elongated inlet channel includes one or more upper inlet plates pivotally attached to said skimmer body.

19. The skimmer device of claim 18, wherein the one or more pivotally adjustable upper inlet plates are oriented in such a way that rotating said pivotally attached upper plates towards said lower section of said elongated inlet channel will extend the elongated inlet channel thereby causing an increase in airflow velocity at the protruding end of the elongated inlet channel.

20. The skimmer device of claim 17, said air duct further comprising an elliptical buffer plate inserted into an end of said air duct for controlling airflow velocity through said air duct.

* * * * *